United States Patent [19]
Adair et al.

[11] 4,450,245
[45] May 22, 1984

[54] SUPPORTED CATALYSTS AND METHOD FOR THEIR PRODUCTION

[75] Inventors: Noel J. Adair; Robert W. Carlisle, both of Carrickfergus; Michael E. Stubbs; John J. Rooney, both of Belfast, all of Ireland

[73] Assignee: Gallaher Limited, London, England

[21] Appl. No.: 361,880

[22] Filed: Mar. 25, 1982

[30] Foreign Application Priority Data

Mar. 26, 1981 [GB] United Kingdom ............... 8109574
Jun. 4, 1981 [GB] United Kingdom ............... 8117198

[51] Int. Cl.³ .................... B01J 21/04; B01J 23/44; B01J 23/72
[52] U.S. Cl. .................................. 502/211; 502/213; 502/244; 502/318; 502/331; 502/346; 502/524
[58] Field of Search ................ 252/437, 455 R, 464, 252/465, 466 PT, 463; 423/600; 502/211, 213, 244, 318, 331, 346, 524

[56] References Cited

U.S. PATENT DOCUMENTS 2,670,381  2/1954  Hadley et al. ............... 252/463 X
3,681,260  8/1972  Foucher et al. ............. 252/463 X

FOREIGN PATENT DOCUMENTS 2042364  9/1980  United Kingdom .

Primary Examiner—W. J. Shine
Attorney, Agent, or Firm—Murray and Whisenhunt

[57] ABSTRACT

A catalyst support can be made by co-precipitating copper aluminate from a solution containing copper and aluminium ions and converting the precipitate into solid, generally particulate, form. The catalyst preferably includes a redox couple and may include promoters. The catalyst is of particular value for the low temperature oxidation of carbon monoxide, especially in a smoking product filter.

11 Claims, No Drawings

SUPPORTED CATALYSTS AND METHOD FOR THEIR PRODUCTION

We have described in our British Patent Publication No. 2,042,364 catalysts comprising a support, copper chemically bonded to the support, and a minor amount of a redox couple for the copper. We have also described redox catalysts comprising copper chemically bonded to a support and in which the copper is mainly divalent but copper on the exposed surfaces is substantially monovalent and the catalyst is in the form of a stable product. We describe how such catalysts may be made by, for instance, impregnating alumina or other support material with a solution of a cupric salt, permitting ion exchange to occur, removing excess solution and repeating the impregnation and ion exchange, and then impregnating the resultant support with a solution of the compound providing the redox couple. This compound may be a palladium compound. The solution of the palladium compound may include various promoters or activators including stannic, lithium or calcium ions. The catalysts are of particular value for the low temperature oxidation of carbon monoxide, for instance when included in the filters of smoking products, but they are also of value in other processes, for instance the oxychlorination or chlorination of hydrocarbons.

When preparing a catalyst for any particular purpose it is necessary to aim at a catalyst which has the best combination of properties for that particular purpose. For instance the catalyst must of course have satisfactory or high catalytic effect in the reaction that is to be conducted, for instance the oxidation of carbon monoxide. However high activity in this reaction is of no value if the catalyst is deficient in other properties. For instance the catalyst needs to be reasonably stable to atmospheric conditions, in order that it is not deactivated before use. Further, the catalyst must not have any undesirable effect on the reaction medium being treated by it. For instance when being used in smoking products it should not have the property of adsorbing from the smoke components that are necessary to give the smoke a pleasant flavour.

It has been our object to devise catalysts which have an improved balance of properties when used for low temperature oxidation of carbon monoxide in smoking products, or for other purposes, and to devise supports for such catalysts.

According to the invention a catalyst comprising a catalyst support is made by a method that comprises forming the support by precipitation of copper aluminate from a solution containing copper and aluminium, followed by solidification of the precipitate. Novel catalysts and catalyst supports made by this method form a further part of the invention.

The support may be made by forming an aqueous solution of a copper salt and an aluminium salt and then adding a base under conditions such as to cause the precipitation of copper aluminate. Suitable salts are the chlorides and nitrates and in particular it is preferred to dissolve copper chloride and aluminium nitrate in water. The temperature of the solution before the addition of the base is generally between ambient and boiling, for instance 60° to 95° C., preferably about 80° to 90° C. The molar ratio of copper:aluminium is preferably about stoichiometric but in any event is generally within the range 3:1 to 1:4, preferably 1:2 to 1:4.

The base that is added to cause precipitation may be any base that will have this effect and may be, for instance, an alkali metal hydroxide or carbonate, urea, or an ammonium compound, preferably concentrated ammonia.

Although precipitation can be brought about at fairly low pH values, by slow addition of the base, best results are obtained in the invention when precipitation occurs at pH values above 7, generally 8 or 9 but possibly as high as 10 or 11. Thus concentrated ammonia may be added to a solution at 80° C. of copper chloride and aluminium nitrate in an amount such as to give a pH of 8 or 9. If too much base is added there may be a tendency for precipitated material to go back into solution.

The resultant precipitate is a gel which is preferably aged in the mother liquors for a period of, for instance ½ to 2 days. The gel is filtered and washed and then dried, for instance by heating at between 100° and 200° C., typically about 150° C.

The solidification of the copper aluminate will be conducted to an extent such that the support has the required hardness and other physical properties. Generally this necessitates roasting the dried support material. Before it is roasted it is preferably put into its desired final shape. Often the support should be in particulate form and the particles may be in the form of a powder, for instance having a particle size of 1 to 50 microns. Accordingly the dried gel may be ground to the desired mesh size before roasting. Other techniques of providing particles of any desired size, for instance pellets, may be used.

The roasting may be effected by heating at a temperature above 300° C., for instance 400° to 500° C. and preferably about 450° C. The roasting may be for, for instance, 2 to 10 hours, generally 3 to 6 hours. After roasting the support may be cooled to room temperature.

The resultant product is useful as a support on which various oxidative catalytic systems may be deposited. For instance carbon monoxide oxidation catalysts may be made by depositing transition metal oxide, e.g. Hopcalite, on such a support. Preferably however the support is used as the support of a heterogeneous oxidation catalyst the activity of which is due to a redox mechanism and so the catalyst will include a redox couple. This redox couple generally comprises an inorganic compound and in particular generally comprises a noble metal compound such as a compound of iridium, ruthenium, rhodium or, especially, palladium. Such compounds are preferably introduced as chlorides. The palladium is preferably divalent and is generally introduced as $PdCl_4^{2-}$. The amount of palladium or other metal that is deposited onto the support may be, for instance, 0.01 to 0.5% by weight, preferably about 0.05 to 0.25%. An advantage of the catalysts is that they maintain good activity even when the amount of palladium is reduced to very low levels.

The palladium or other redox couple may be effective solely as a result of coupling with the copper in the copper aluminate but preferably a second catalytic component, that will form a redox couple with the palladium or other noble metal compound, is also deposited on the support. This second redox component is preferably copper. Thus in the preferred system a copper aluminate support is formed by coprecipitation and drying and then further copper and a noble metal compound or other redox couple is deposited onto the copper aluminate support. The amount of copper or other component that will form a redox couple is generally from 0.05 to 1% by weight.

Typically a copper aluminate support which has been roasted and cooled to room temperature is impregnated with a solution of sodium tetrachloropalladate and a copper salt, generally copper chloride, in a suitable solvent, which is generally a non-aqueous solvent such as methanol or a mixture of methanol with methylene chloride. The product is then dried, for instance at room temperature, with most and preferably all of the catalytic components of the solution thereby being adsorbed into the support. If desired the support may then be heated, for instance from 100° to 200° C.

The resultant products are very active oxidising catalysts, for instance for the low temperature oxidation of carbon monoxide or for chlorination or oxychlorination of hydrocarbons. A particular advantage of them is that, when used in smoking products, they give an adequate level of oxidation of carbon monoxide but very low adsorption of desirable ingredients in the smoke. Thus their inclusion in cigarette or other smoking product filters results in a decrease of the carbon monoxide content but little or no undesirable change in the flavour of the smoke. They also have the advantage that they remove a significant amount of the formaldehyde in the smoke.

Promoters may be deposited onto the support, for instance in the same way as promoters are deposited on the supports described in our British Patent Specification No. 2,042,364. However we have surprisingly found that very desirable improvements in storage stability are obtained if certain promoters are precipitated with the copper aluminate, and this improvement is of value in all catalytic systems described above, but is of particular value for the redox systems, and especially those that are to be used for low temperature oxidation of carbon monoxide.

Preferred promoters are zirconium, phosphorus, silicon, tungsten, vanadium and molybdenum and the precipitation is preferably conducted in the presence of compounds of one or more of these. Preferably mixtures of two or more of these promoters are used and preferably the mixture contains at least one promoter selected from molybdenum, phosphorus and vanadium. Vanadium in particular appears to be especially desirable. Best results are obtained when precipitation is conducted in the presence of one or more compounds providing molybdenum, vanadium and phosphorus. Thus the precipitation may be conducted from an aqueous solution containing, for instance, a heteropolyacid of molybdenum, vanadium and phosphorus.

Suitable compounds that may be included into the aqueous system from which the copper aluminate is precipitated include ammonium metavanadate, ammonium molybdate, zirconium nitrate, sodium tungstate, and silicotungstic acid and also phosphoric acid. Such materials may be combined initially with the aluminium salt or the copper salt, prior to admixture with the other salt, or may be added to a solution of the aluminium and copper salts before gel formation.

The inclusion of orthophosphoric acid (or an appropriate salt thereof) can have significant effects on the physical properties of the support. If too much is added then there can be a significant reduction in density of the final support but when using small amounts very high density supports can be obtained. Normally the orthophosphoric acid is added to the preformed solution containing aluminium and copper salts.

The following are some examples of the invention.

EXAMPLE 1

65 g of aluminium nitrate and 4 g cupric chloride were dissolved separately in distilled water and the two solutions combined. The solution was slowly heated to 90° C. and maintained at this temperature for several minutes, before 35–40 mls of ammonia solution (or other base) was added quickly with continuous stirring to ensure uniform distribution of the copper aluminate gel. The addition of ammonia was continued until a pH of 8 or 9 was obtained.

The precipitate formed was allowed to age in the mother liquor for 24 hours or more prior to filtration using a Buchner funnel and washing with distilled water.

The material was dried by slowly heating to 150° C. in an oven in air and maintained at this temperature for 24 hours. The dried material was then ground to the desired particle size preferably 30×60 mesh (250–500 $\mu$m) using a mortar and pestle. Finally the material was heated to 450° C. for 4 or 5 hours before being allowed to cool to room temperature in a desicator.

The material formed was then used as a support for producing a heterogeneous carbon monoxide catalyst as follows.

8 mg of sodium tetrachloropalladate (II) (0.1% Pd by weight) and 225 mg cupric chloride (or other chloride salt) were dissolved in 20 mls solvent (preferably methanol). 3 g of the freshly prepared support was added into the solution and the solvent allowed to evaporate off overnight.

EXAMPLE 2

The process of Example 1 was repeated except that the solution of aluminium nitrate and cupric chloride is heated to 80° C. and then 1 to 2 mls orthophosphoric acid was added before adding the ammonia solution. The gel was converted into a support in the same manner as Example 1 and then a catalyst formed containing 0.1% Pd by weight in the same manner as in Example 1.

EXAMPLE 3

7 g ammonium metavanadate and 7 g ammonium molybdate were dissolved separately in hot water and mixed together. 65 g aluminium nitrate and then 8 g cupric chloride were added to this hot solution, and finally 1 ml orthophosphoric acid was added.

The mixture was boiled for 30 minutes before ammonia solution or other base was added as in Example 1 and the gel that was precipitated was made up into a catalyst support as in Example 1. The support was then impregnated with sodium tetrachloropalladate to form catalysts containing from 0.1 to 0.5% Pd.

It was observed that if amounts of orthophosphoric acid greater than about 3 mls were used then gels of lower density were produced. In general it is necessary to keep the amount less than 1.5 mls as otherwise the density may be too low for our preferred purpose, namely as a support for cigarette filters.

It was also observed that the catalyst made in this example could be left exposed to the open atmosphere for prolonged periods, e.g. one week, without any decrease in activity for the oxidation of carbon monoxide.

The activity of each of the catalysts made in these examples was determined as the percentage removal of carbon monoxide from a gas mixture containing 3% CO, 10% $CO_2$, 13% $O_2$ and balance $N_2$, when the mixture is puffed 10 times through a 500 mg sample of the catalyst under standard smoking conditions i.e. 1 puff per minute of 35 ml volume and 2 seconds duration. All 10 puffs are combined and the CO reduction measured. More than one 10 puffs cycle can be measured. In each of the examples the catalyst was found to have an activity of above 70%.

We claim:

1. A method of making an oxidation catalyst comprising forming a solution containing copper ions and aluminum ions and causing formation of a gel precipitate of copper aluminate by adding a base to the solution, drying the gel, forming a shaped catalyst support from the gel, and depositing on the shaped support a catalytic material selected from the group consisting of transition metal oxides and materials that will form a redox couple with the copper of the support.

2. A method according to claim 1, in which the gel precipitate is formed by adding sufficient base to give a pH of from 8 to 11 while the solution has a temperature above 60° C.

3. A method according to claim 1, in which the molar ratio copper:aluminium in the solution is 1:2 to 1:4.

4. A method according to claim 1, in which the shaped catalyst support is formed from the dried gel by roasting at 300° to 500° C.

5. A method according to claim 1, in which the catalytic material comprises a material that will form a redox couple with the copper of the support.

6. A method according to claim 1, in which the catalytic material comprises a noble metal compound.

7. A method according to claim 1, in which the catalytic material comprises a noble metal compound and copper.

8. A method according to claim 1, in which the said solution contains also ions of at least one promoter selected from the group consisting of zirconium, phosphorus, silicon, tungsten, vanadium, and molybdenum.

9. A method according to claim 1, in which the said solution contains ions of at least one promoter selected from the group consisting of molybdenum, phosphorus and vanadium.

10. A method according to claim 1, in which the said solution contains ions of molybdenum, phosphorus and vanadium as promoters.

11. A catalyst comprising catalytic material carried on a support and which has been made by the method of claim 1.

* * * * *